Figure 1:
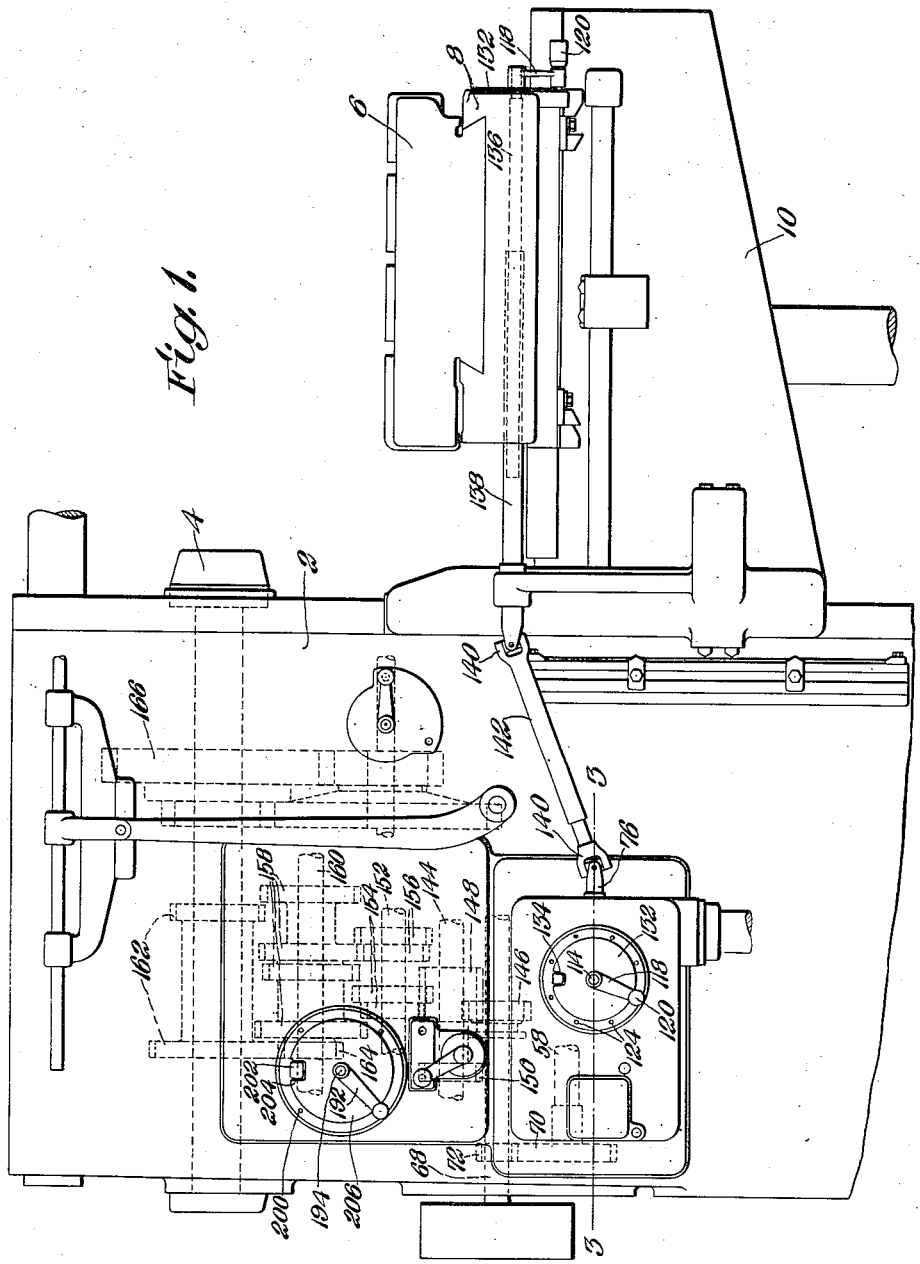

Jan. 15, 1924.

B. P. GRAVES 1,480,900

MILLING MACHINE

Filed July 22, 1922 5 Sheets-Sheet 1

Witness:
Alfred H. McGlinchey.

Inventor:
Benjamin P. Graves
Van Everen Fish Hildreth & Cary
Attys

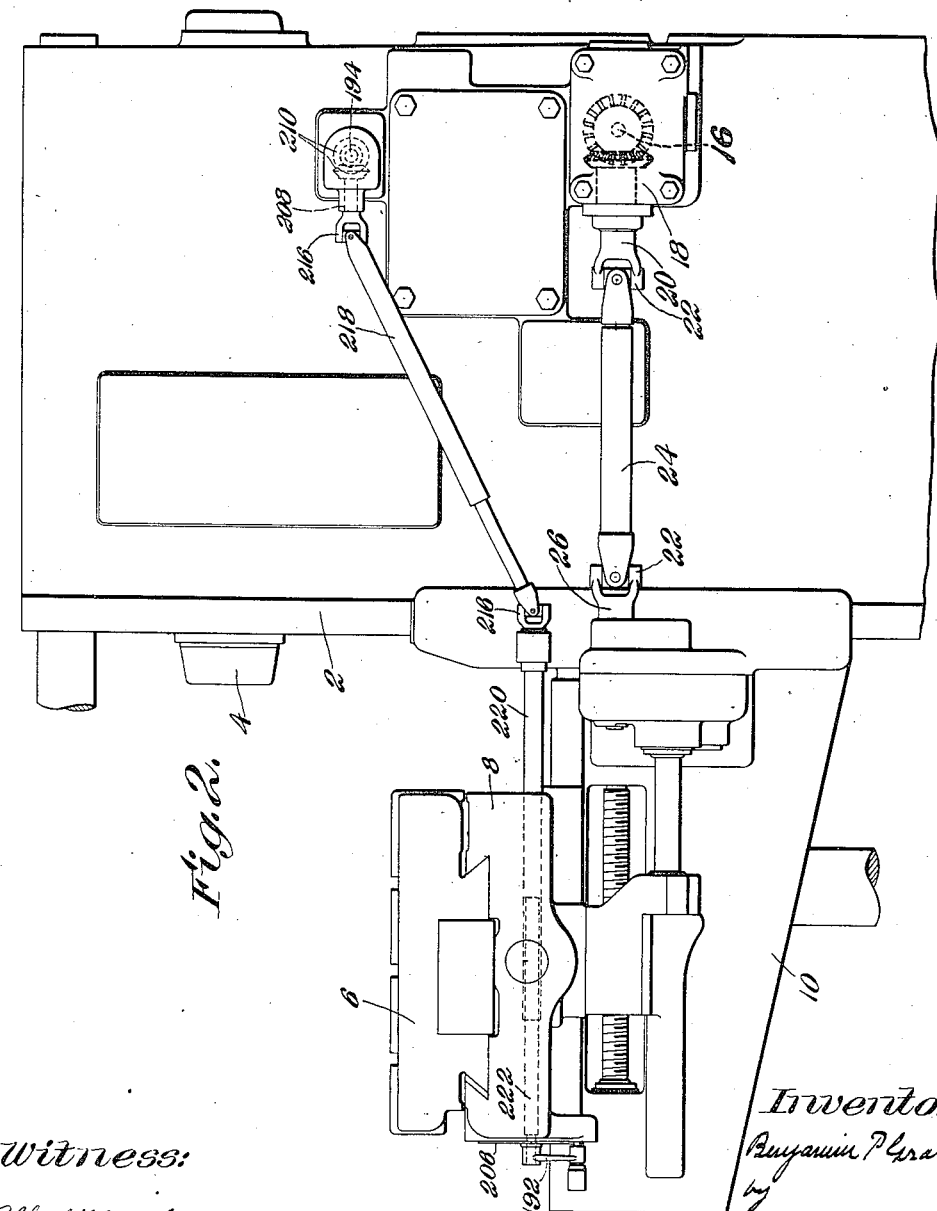

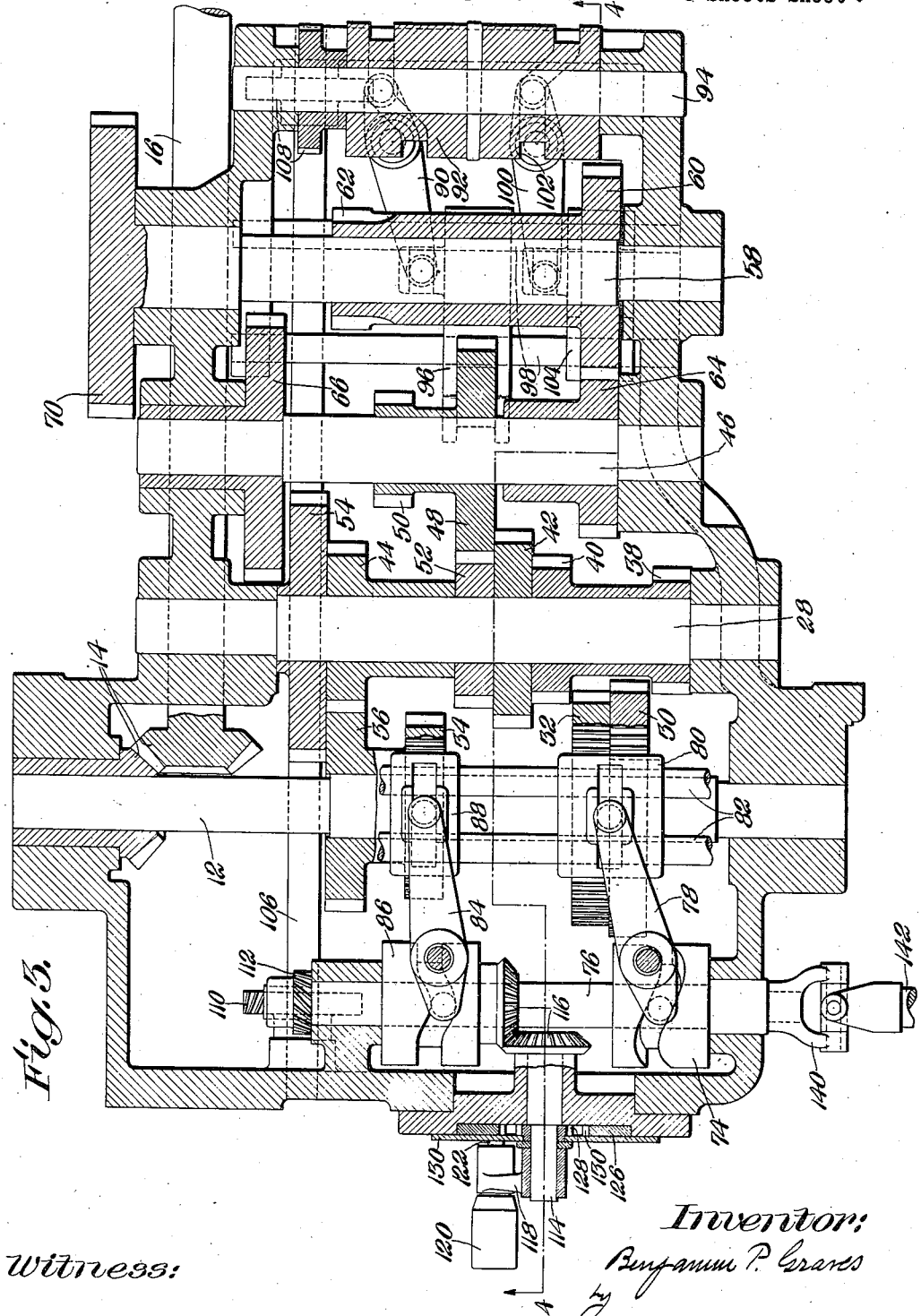

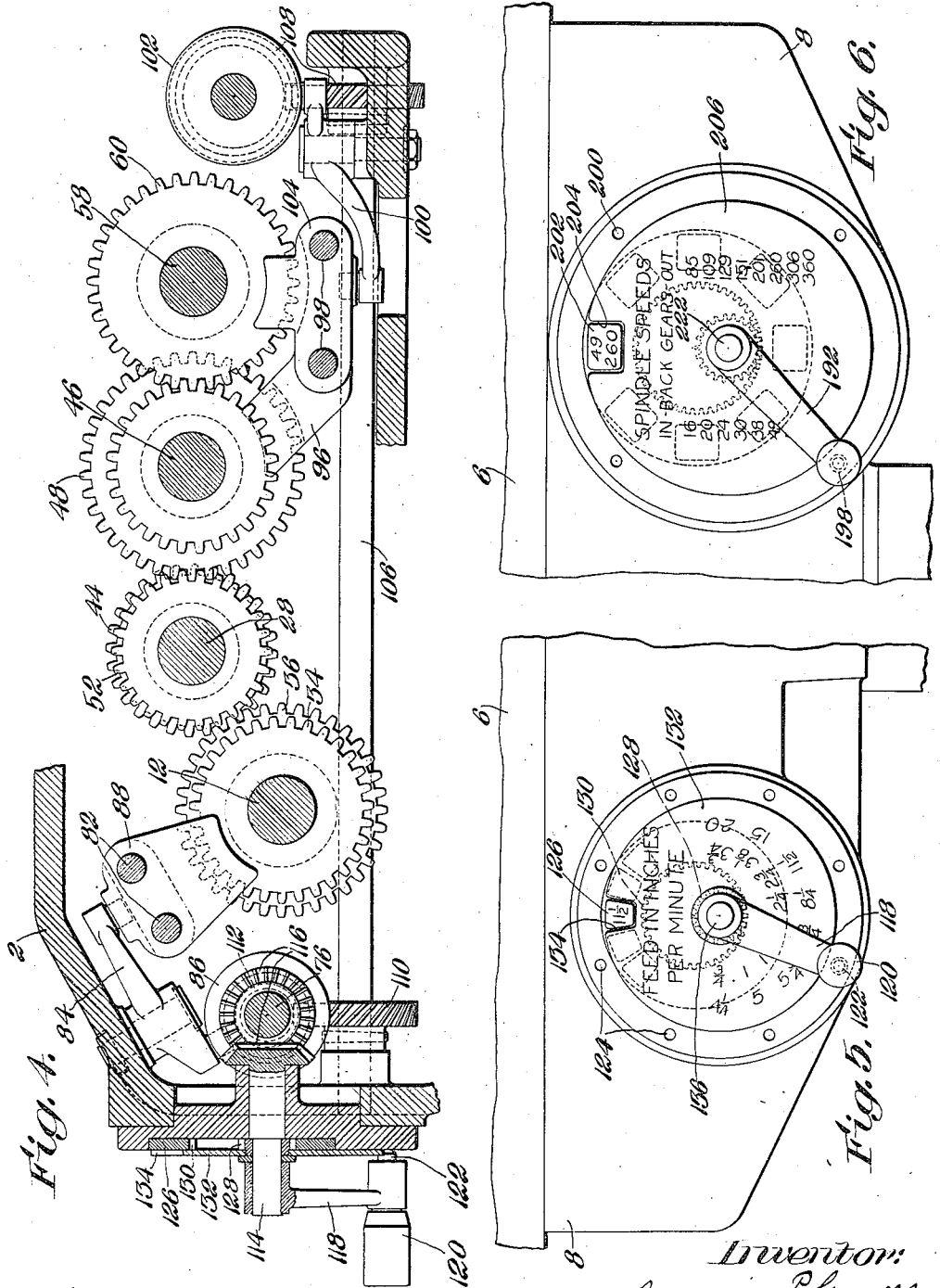

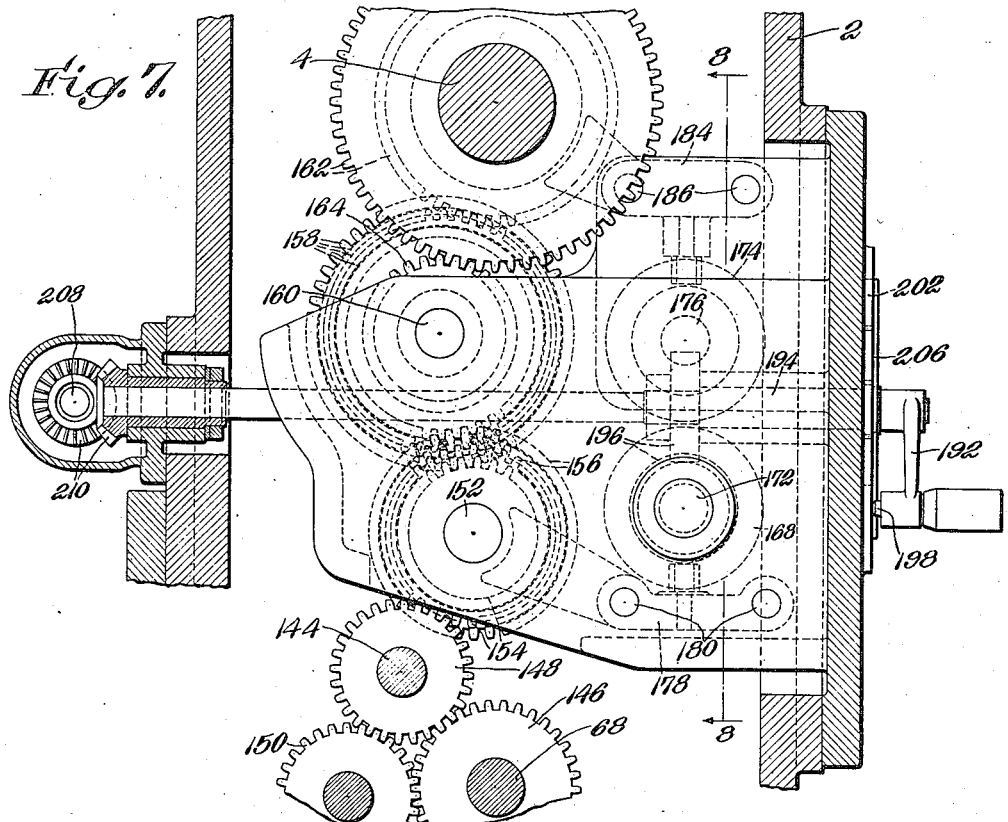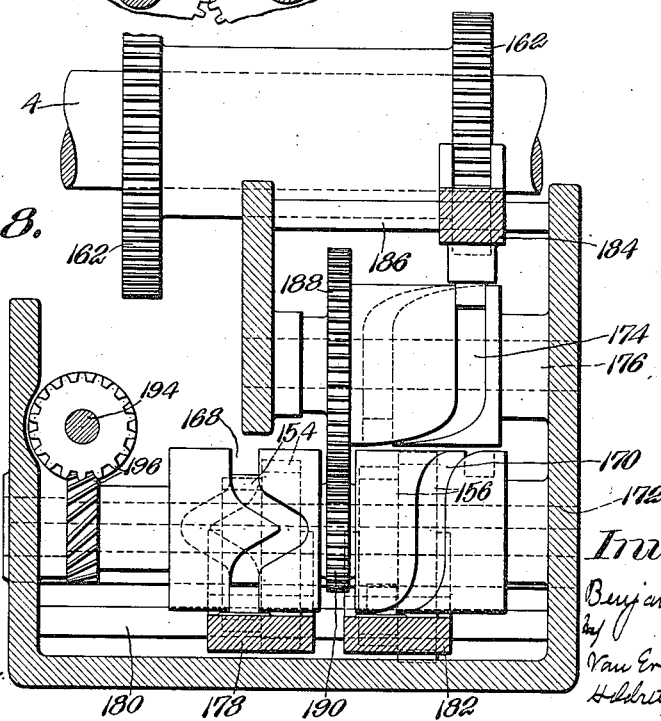

Patented Jan. 15, 1924.

UNITED STATES PATENT OFFICE.

BENJAMIN P. GRAVES, OF PROVIDENCE, RHODE ISLAND, ASSIGNOR TO BROWN AND SHARPE MANUFACTURING COMPANY, A CORPORATION OF RHODE ISLAND.

MILLING MACHINE.

Application filed July 22, 1922. Serial No. 576,786.

*To all whom it may concern:*

Be it known that I, BENJAMIN P. GRAVES, a citizen of the United States, residing at Providence, in the county of Providence and State of Rhode Island, have invented certain new and useful Improvements in Milling Machines; and I do hereby declare the following to be a full, clear, and exact description of the invention, such as will enable others, skilled in the art to which it appertains to make and use the same.

The invention relates to the type of milling machine in which provision is made for varying the spindle speed and for varying the rate of feed of the work.

In machines of this class it is desirable that the heavy mechanism comprised in the variable speed mechanisms through which changes in the spindle speed and changes in the rate of feed are effected be so mounted and arranged that their weight will have no tendency to affect the position of the movable work supporting members or influence the accuracy and smoothness of the movements imparted to these members in feeding the work. For convenience and rapidity in adjusting these machanisms either in setting up the machine for work to be done or for effecting changes in the spindle speed or in the rate of feed during the operation upon a piece of work it is also desirable that the operator should be able to adjust them when stationed in such position that he may readily inspect the work which is being set up or being operated upon.

To secure these results the present invention contemplates mounting the variable speed mechanisms above referred to upon the fixed base or column of the machine and providing adjusting means for each of these mechanisms operable by the operator when stationed either at the front or at the back of the table. With this construction and arrangement the work supporting members such as the knee, saddle or table, which are moved in adjusting or feeding the work, are unaffected by the weight or movements of either of the variable speed mechanisms, with a corresponding increase in the accuracy and ease of adjustment and feed. At the same time the production and efficiency of the machine is increased since the operator may quickly and conveniently adjust one or both of the mechanisms when stationed where he can inspect the work at the point to be operated upon by the tool whether such station be at the front of the machine or at the rear of the table as, for instance, in the use of end mills operating upon the rear side of the work.

The adjusting means may be of any suitable character but preferably comprises a controller element arranged at the front of the table and a second controller element arranged at the rear of the table, either of which may be operated by the operator, and both of which are connected to set or adjust the corresponding variable speed mechanism.

The various features of the invention will be understood from the following detailed description of the mechanisms illustrated in the accompanying drawings in which Fig. 1 is a left hand side elevation showing so much of a milling machine as is necessary to illustrate the application of the preferred form of the present invention thereto, Fig. 2 is a right hand side elevation, Fig. 3 is a horizontal section on line 3—3 of Fig. 1 showing the variable speed mechanism for the feed, Fig. 4 is a sectional elevation on the broken line 4—4, Fig. 3, Fig. 5 is a detailed front elevation of the feed controller element and indicating device mounted on the front of the saddle, Fig. 6 is a similar view of the spindle speed controller and indicating device also mounted on the front of the saddle, Fig. 7 is a sectional elevation showing the variable speed mechanism through which the spindle is rotated and Fig. 8 is a sectional detail on line 8—8 of Fig. 7.

In the drawings the invention is shown embodied in a milling machine of the column and knee type. In this machine the fixed machine base includes a column 2, in which the spindle 4 is mounted. The work is carried on a work supporting table 6 mounted for longitudinal movement in a supporting saddle 8 which is in turn mounted for transverse movement on a supporting knee 10 which is in turn mounted for vertical movement on the column 2 as is usual in this type of machine. The spindle and work supporting table are relatively moved by one or both of two variable speed mechanisms through one of which variably feeding movements are imparted to the table either directly or through movement of the saddle or knee and through the other of which the spindle is rotated at variable speeds. These mechanisms are mounted in and supported by the fixed column and each may be adjusted by a controller element mounted on the left side of the column and conveniently accessible by the operator when standing at this side of the column at the rear of the table where he can inspect the cutter and work when setting up or operating upon work which is to be milled upon its rear side and at a point which is not visible from a position at the front of the machine. The mechanism through which each of these variable speed mechanisms are adjusted is also connected with a similar controller mounted upon the front of the saddle where it is within convenient reach of the operator when at the front of the machine and in position to inspect the cutter and work when operating upon parts of the work which are visible from the front of the machine. Associated with each controller element for the variable feed mechanism is an indicator which brings to view the rate of feed in inches per minute corresponding to each setting of the controller. A similar indicator is associated with each controller for the variable spindle speed mechanism which indicates in revolutions per minute the spindle speed corresponding to the settings of the controller.

The variable speed mechanism for the feed is shown in Figs. 3 and 4 and includes a driven shaft 12 connected by beveled gears 14 with a shaft 16 which extends from the left to the right side of the column 2 and is there connected through suitable mechanism contained within the reverse box 18 (Fig. 2) with a shaft 20. This shaft is connected through universal joints 22 and an extensible shaft 24 with a shaft 26 mounted on the knee and connected through suitable gearing and clutches to transmit movement in either direction to either the knee, saddle or table. The shaft 12 may be driven from the shaft 28 through any one of the four gears 30, 32, 34 and 36 which are mounted to slide on the shaft 12 and may be moved into and out of engagement with the corresponding gears 38, 40, 42 and 44 on the shaft 28. The shaft 28 may be driven from a parallel shaft 46 through either of two gears 48 and 50 which are mounted to slide on the shaft 46 and may be moved into and out of engagement with corresponding gears 52 and 54 on the shaft 28. The shaft 46 may be driven from a parallel shaft 58 through either one of two gears 60 and 62 which are mounted to slide on the shaft 58 and may be moved into and out of engagement with corresponding gears 64 and 66 on the shaft 46. Through this gearing the shaft 12 may be driven from the shaft 58 at any one of sixteen different speeds by shifting the positions of the sliding gears.

The shaft 58 is continuously driven from the main driving shaft 68 through a gear 70 on the end of the shaft 58 which is engaged by a gear 72 on the driving shaft.

The sliding gears are shifted to secure the sixteen variations in the rate of feed by cams which may be rotated to shift the gears into relative positions to secure any one of the sixteen different rates of feed. The gears 30 and 32 are connected together and are shifted by a cam 74 secured to a cam shaft 76 and engaged by a pin on one end of a cam lever 78, the other end of which carries a pin engaging a slot in a slide 80. The slide is mounted on guide rods 82 and is provided with flanges embracing the gears 30, 32. The gears 34, 36 are also secured together and are shifted through a lever 84, one end of which is engaged by a cam 86 on the shaft 76 and the other end of which engages a slide 88 mounted on the rods 82 and provided with flanges embracing the gear 34. The gears 48 and 50 are also connected together and are shifted through a cam lever 90, one end of which engages a cam 92 on the shaft 94, and the other end of which engages a slide 96 mounted on guide rods 98 and provided with flanges embracing the gear 48. The gears 60 and 62 are also secured together and are shifted by a cam lever 100, one end of which is engaged by a cam 102 on the shaft 94 and the other end of which engages a slide 104 which is mounted on the rods 98 and is provided with flanges embracing gear 60. The cam shafts 76 and 94 are connected together to rotate in time with each other through a shaft 106, one end of which is connected through spiral gears 108 with the shaft 94, and the other end of which is connected through spiral gears 110 and 112 with the shaft 76.

There are four changes in the relative positions of the four gears 48, 50, 60, 62 for each cycle of speed changes while there are sixteen changes in relative position of the four gears 30 to 36 for each cycle of speed changes, or four changes in the relative positions of these gears for each change in the relative positions of gears 48, 50, 60, 62, this cycle of four changes being repeated for each of the four changes of the latter gears. In order that cams of comparatively small diameter may be utilized and the mechanism be compactly arranged the cams 74 and 86 for shifting gears 30 to 36 are each formed in duplicate to shift the gears through two of their cycles of relative positions and the shaft 76 is turned through two revolutions while the cam shaft 94 is turned through a single revolution in making a complete cycle of the sixteen speed changes. To secure this timing of the cam shafts the gear 112 is one-half the diameter of the gear 110.

The means for rotating the shaft 76 to adjust the variable speed gearing for the different rates of feed comprises two manually operated controlling and feed indicating devices, both of which are connected with the shaft 76 and one of which is mounted on the side of the column 2, and the other of which is mounted on the front of the saddle 8. The controlling and indicating means on the side of the column comprises a shaft 114, the rear end of which is connected by beveled gears 116 with the shaft 76 and the outer end of which carries a controller element in the form of a crank arm 118 provided at its outer end with a handle 120. The handle is provided with a spring pin 122 having a conical end as indicated in Fig. 4 adapted to enter any one of a series of locating holes 124. There are eight locating holes corresponding to the eight different relative positions of the sliding gears effected by a single revolution of the cam shaft 76 and a half revolution of the cam shaft 94. To make a complete cycle of changes two revolutions of the controller arm are required and to indicate the feed corresponding to any setting of the handle an indicator dial 126 is provided which is given a single revolution for two revolutions of the controller arm through a pinion 128 secured to the shaft 114 and engaging an internal gear 130 of twice its diameter formed on the inner edge of the dial. The dial is provided with graduations which preferably indicate the rate of feed in inches per minute corresponding to each setting of the controller and all the graduations except that corresponding to the settings of the controller are preferably hidden from view by a cover plate 132 which is provided with a sight opening 134 at which the graduation corresponding to the setting of the controller is brought to view by rotation of the controller into any given position. To secure any given feed, therefore, the operator merely turns the controller until the desired feed appears at the sight opening, the controller and variable speed mechanism being held in this adjusted position by the engagement of the spring pin 122 with one of the recesses 124. The cover plate 132 may, if desired, be provided with a table indicating the various feeds which may be secured by adjustment of the controller arm.

The controlling and indicating means on the front of the saddle is the same in construction as that on the side of the column. The controller arm 118 of this means is secured on the forward end of the shaft 136 mounted in the saddle 8 and having a driving and sliding connection with a shaft 138 mounted in the knee 10. The rear end of the shaft 138 is connected by hooks joints 140 and an extensible shaft 142 with the forward end of the cam shaft 76. These connections enable the variable speed mechanism on the column to be quickly and conveniently adjusted from the front of the machine without interfering with the vertical or horizontal movements of the knee and saddle. When either controlling and indicating means is operated by the operator, the spring pressed pins 122 of both indicating and controlling means ride out of the corresponding recesses 124 with which they have been engaged and enter and ride out of each recess past which the handle 120 is turned by the operator.

The variable speed mechanism through which the spindle is driven comprises a shaft 144 which is driven from the main driving shaft 68 through a sliding reversing gear 146 adapted to be shifted into engagement with a gear 148 on the shaft 144 or into engagement with an intermediate gear which is connected with the shaft 144 through a gear 150 (Fig. 1). The shaft 144 is connected to drive a parallel shaft 152 through one of a pair of sliding gears 154 one of which is continually in engagement with the broad-faced gear 148. The shaft 152 carries a second pair of sliding gears 156, and any one of the four sliding gears on the shaft 152 may be engaged with a corresponding one of a series of four gears 158 secured to a shaft 160 and thus the shaft 160 may be driven at any one of four different speeds from the shaft 152. Motion may be transmitted from the shaft 160 to a sleeve on the spindle through either of a pair of sliding gears 162, one of which is adapted to engage one of the gears 158 and the other of which is adapted to engage a gear 164 on the shaft 160. The sleeve carrying the sliding gear 162 may be connected directly to the spindle or may be connected therewith through the usual back gears indicated at 166. By shifting the two pairs of gears 154 and 156 and the pair of gears 162 the spindle may be driven directly at any one of eight different speeds or indirectly through the back gears at any one of eight additional speeds.

The mechanism for shifting the sliding gears is similar to the mechanism for shifting the sliding gears of the variable speed mechanism which determines the rate of feed and is illustrated in Figs. 7 and 8. The two pairs of gears 154 and 156 which are shifted into four relative positions for each position of the pair of gears 162 are shifted by two cams 168 and 170 secured on a cam shaft 172 while the pair of gears 162 is shifted by a cam 174 on a cam shaft 176 which makes one revolution for two revolutions of the cam shaft 172. The cam 168 engages a roll on a slide 178 which is guided on the guide rods 180 and is provided with flanges embracing the gears 154. The cam 170 operates a similar slide 182 provided with flanges embracing the gears 156. The cam 174 operates a similar slide 184 mounted on guide rods 186 and provided with flanges embracing one of the pair of gears 162. The cam 174 is driven from the cam shaft 172 through a gear 188 connected with the cam and engaging a gear 190 of half the diameter connected with the cams 168 and 170. In this mechanism the cams 168 and 170 are shaped to shift the two pairs of gears 154 and 156 through a single cycle of their four relative positions for each rotation of the cams and the cams are rotated through a quarter revolution in effecting each speed change.

The means for rotating the cam shafts to adjust the sliding gears for the different spindle speeds is similar in construction to the means already described for rotating the gear shifting cams of the variable feed mechanism and comprises two controlling and indicating means, one mounted on the side of the column and the other mounted on the front of the saddle. The controller arm 192 at the side of the column is secured on the outer end of a shaft 194 which is connected by spiral gears 196 with the cam shaft 172 so that the gear shifting cams are shifted through a cycle of their eight different relative positions by two rotations of the controller arm. The controller arm is held in any of its adjusted positions by the engagement of the spring pressed pin 198 with one of a series of four positioning holes 200. The spindle speed corresponding to any one of the eight settings to the controller arm are indicated by graduations on the indicator dial 202 at the side opening 204 in the cover plate 206. The means for connecting the controller arm 192 at the front of the saddle with the cam shafts comprises a shaft 208, one end of which is connected with the shaft 194 by the beveled gears 210, and the other end of which is connected by hooks joints 216 and an extensible shaft 218 with the rear end of a shaft 220 which is mounted in the knee. This shaft has a driving and sliding connection with a shaft 222 to the forward end of which the controller arm 192 at the front of the saddle is secured. The indicator dials for the spindle speed mechanism are provided with two sets of graduations as indicated in Fig. 6, one indicating the spindle speed with the back gears in and the other the spindle speed with the back gears out.

While it is preferred to employ the specific construction and arrangement of parts shown and described in embodying the invention in a machine having the general construction and arrangement of parts indicated in the drawings it will be understood that this construction and arrangement is not essential to the broader features of the invention and may be varied or modified as found desirable or best suited to the construction and arrangement of parts of the machine in which it is to be embodied.

What is claimed is:

1. A milling machine having, in combination, a spindle, a work table, variable speed mechanism for relatively moving the spindle and work table, and adjusting means for said mechanism manually operable by the operator when stationed either at the rear or at the front of the table.

2. A milling machine having, in combination, a spindle, a work table, variable speed mechanism for relatively moving the spindle and work table, a manually operable controller connected to adjust said mechanism and arranged at the rear of the table, and a manually operable controller element connected to adjust said mechanism and arranged at the front of the machine.

3. A milling machine having, in combination, a fixed support, a spindle mounted thereon, a work table, variable speed mechanism mounted in the fixed support and connected to transmit any of a plurality of working feeds to the table, and a manually operable controller at the front of the machine connected to adjust said mechanism.

4. A milling machine having, in combination, a fixed support, a spindle mounted thereon, a work table, a movable support for the table, variable speed mechanism mounted in the fixed support and connected to transmit any of a plurality of working feeds to the table, a manually operable controller mounted on the front of the movable table support, and connections through which the variable speed mechanism is adjusted by the controller.

5. A milling machine having, in combination, a spindle, a work table, variable speed gearing for relatively moving the spindle and work table including shiftable gears, cams for shifting the gears, a shaft connected to operate the cams, a manually operable controller connected to rotate the shaft and arranged at the rear of the table and a second manually operable controller connected to rotate the shaft and arranged at the front of the machine.

6. A milling machine having, in combination, a spindle, a work table, a fixed support for the spindle at the rear of the table, a movable support for the table, a variable speed gearing on the fixed support for relatively moving the spindle and work table including shiftable gears, cams for shifting the gears, a shaft on the fixed support connected to operate the cams, a manually operable controller on the shaft, a manually operable controller on the front of the movable support, and connections through which the second controller operates the shaft.

7. A milling machine having, in combination, a spindle, a work table, variable speed gearing for relatively moving the spindle and work table, a manually operable rotary controller for said mechanism, mechanism through which two revolutions of the controller effects a single cycle of adjustments of the variable speed mechanism, an indicator dial provided with an internal gear and a pinion of half the diameter on the controller engaging the internal gear.

8. A milling machine having, in combination, a spindle, a work table, a variable speed gearing for relatively moving the spindle and work table including two sets of gears, cams for shifting one set of gears, cams for shifting the other set of gears through its cycle of relative positions for each shift of the first set, and a manually operable controller for operating the cams.

9. A milling machine having, in combination, a spindle, a work table, variable speed mechanism for relatively moving the spindle and work table, a manually operable rotary controller for said mechanism, mechanism through which two revolutions of the controller effects a single cycle of speed adjustments, and an indicator moved through a single cycle by two revolutions of the controller.

10. A milling machine having, in combination, a spindle, a work table, a variable speed gearing for relatively moving the spindle and work table, a manually operable controller for said mechanism, an indicator connected to move in time with the controller and provided with indicating graduations, and a cover provided with a sight opening at which the graduation corresponding to the setting of the controller is visible.

11. A milling machine having, in combination, a spindle, a work table, and mechanisms for varying the spindle speed and the rate of feed, each including adjusting means manually operable by the operator when stationed either at the rear or at the front of the table.

12. A milling machine having, in combination, a spindle, a work table, variable speed mechanism through which the spindle is driven, variable speed mechanism through which the table is fed, and a controller for adjusting each variable speed mechanism manually operable by the operator when stationed at the front of the machine.

13. A milling machine having, in combination, a spindle, a work table, mechanisms for varying the spindle speed and rate of feed each including a manually operable controller element arranged at the rear of the table, and a manually operable controller element arranged at the front of the machine.

14. A milling machine having, in combination, a spindle, a work table, mechanisms for varying the spindle speed and the rate of feed, each including two manually operable controller elements, one operable by the operator when stationed at the front, and the other operable by the operator when stationed at the rear of the table.

15. A milling machine having, in combination, a spindle, a work table and feed change mechanism for determining the rate of feed, including adjusting means manually operable by the operator when stationed either at the rear or at the front of the table.

16. A milling machine having, in combination, a spindle, a work table, feed change mechanism for determining the rate of feed, including a manually operable adjusting element arranged at the rear of the table, and also a manually operable adjusting element arranged at the front of the machine.

17. A milling machine having, in combination, a spindle, a work table and variable speed mechanism through which the spindle is driven, including adjusting means manually operable by the operator when stationed either at the rear or at the front of the table.

18. A milling machine having, in combination, a spindle, a fixed support therefor, a work table, a transversely movable saddle on which the work table is mounted, variable speed mechanism for relatively moving the table and spindle mounted on the fixed support, and a manually operable controller mounted on the front of the saddle and connected to adjust said variable speed mechanism.

19. A milling machine having, in combination, a spindle, a work table, a fixed column on which the spindle is mounted, a movable support on which the table is mounted, a variable speed mechanism mounted on the column for relatively moving the spindle and work table, a manually operable controller on the side of the column connected to adjust said mechanism, and a manually operable controller mounted on the movable table support, also connected to adjust said mechanism.

BENJAMIN P. GRAVES.